United States Patent [19]

Schmid et al.

[11] Patent Number: 5,051,485

[45] Date of Patent: Sep. 24, 1991

[54] METHOD FOR PRODUCING TACKIFIER RESINS

[75] Inventors: John J. Schmid; James W. Booth, both of Panama City, Fla.

[73] Assignee: Arizona Chemical Company, Panama City, Fla.

[21] Appl. No.: 452,200

[22] Filed: Dec. 18, 1989

[51] Int. Cl.$^5$ ................................................ C08F 4/14
[52] U.S. Cl. ..................................... 526/208; 526/237; 526/281; 526/282; 526/340; 526/340.2; 526/346; 526/347; 528/499
[58] Field of Search ............... 526/208, 237, 282, 347, 526/281, 339, 340, 340.2, 346, 347.1; 502/172; 528/499

[56] References Cited

U.S. PATENT DOCUMENTS

| | | | |
|---|---|---|---|
| 2,317,857 | 4/1943 | Soday | 269/86 |
| 2,317,858 | 4/1943 | Soday | 260/86 |
| 2,317,859 | 4/1943 | Soday | 260/86 |
| 2,335,912 | 12/1943 | Burroughs | 260/80 |
| 2,405,558 | 8/1946 | Borglin | 260/80 |
| 2,681,903 | 6/1954 | Linsk | 526/208 |
| 2,932,631 | 4/1960 | Rummelsburg | 260/80 |
| 3,413,246 | 11/1968 | Weymann et al. | 260/4 |
| 3,467,632 | 9/1969 | Davis | 260/80.7 |
| 3,478,005 | 11/1969 | Wheeler | 260/80.7 |
| 3,478,007 | 11/1969 | Barkley et al. | 260/88.2 |
| 3,577,398 | 5/1971 | Pace et al. | 260/85.3 |
| 3,737,418 | 6/1973 | Ruckel et al. | 526/281 |
| 3,816,381 | 6/1974 | Phillips | 260/88.2 D |
| 3,852,218 | 12/1974 | Phillips | 252/442 |
| 3,950,453 | 4/1976 | Ishiguro et al. | 260/878 B |
| 4,011,385 | 3/1977 | Wang et al. | 260/82.1 |
| 4,016,346 | 4/1977 | Wojcik et al. | 526/221 |
| 4,057,682 | 11/1977 | Ruckel et al. | 526/190 |
| 4,075,404 | 2/1978 | Douglas et al. | 526/237 |
| 4,077,905 | 3/1978 | Wang et al. | 252/429 A |
| 4,113,653 | 9/1978 | Ruckel et al. | 252/429 B |
| 4,487,873 | 12/1984 | Jagisch et al. | 524/158 |
| 4,487,901 | 12/1984 | Malpass, Jr. | 526/185 |
| 4,670,504 | 6/1987 | Cardenas et al. | 524/504 |
| 4,677,176 | 6/1987 | Evans et al. | 526/290 |
| 4,683,268 | 7/1987 | Ahner | 526/290 X |
| 4,757,114 | 7/1988 | Tochinai et al. | 525/289 |

Primary Examiner—Fred Teskin
Attorney, Agent, or Firm—Luedeka, Hodges, Neely & Graham

[57] ABSTRACT

The present invention provides a method for the polymerization or copolymerization of a monomer or blend of monomers selected from the group consisting of C-10 terpenes, vinyl aromatics and C-5 dienes that comprises complexing a Lewis acid with an organic ketone to produce a catalyst complex. The monomer or blend of monomers is added to the catalyst complex producing the reaction mixture. The reaction mixture is maintained at a temperature of between 10° C. and 60° C. and, when the reaction is complete, is quenched with water. The polymerized or copolymerized resin is then recovered.

15 Claims, 2 Drawing Sheets

METHOD FOR PRODUCING TACKIFIER RESINS

This invention relates to the cationic polymerization of terpenes, hydrocarbons and terpenehydrocarbon mixtures using a catalyst complex of a Lewis acid and organic ketones.

Tackifying resins are an important component of a wide variety of adhesive systems. One type of adhesive composition where tackifying resins are used is a solvent-based pressure sensitive adhesive. Such an adhesive may be prepared by using the resin in combination with an elastomeric polymer, examples of which include natural rubber, styrene-butadiene rubber (SBR) and other synthetic block and multiblock copolymers such as styrene-isoprene-styrene (SIS) and the middle block saturated styrenic copolymers such as styrene - polyethylene/cobutylene-styrene (SEBS). For solution coated adhesives the resin and the elastomer are dissolved in a solvent such as toluene. Antioxidants and other stabilizers may be included in the formulation if desired.

Tackifying resins are also used in hot melt adhesives which may be either of the pressure sensitive or nonpressure sensitive type. A hot melt pressure sensitive adhesive may be prepared by co-dissolving the resin, an elastomer of the type previously mentioned, a naphthenic plasticizer and an antioxidant at an elevated temperature. A nonpressure sensitive hot melt adhesive could be made, for example, by hot-blending a tackifying resin, a microcrystalline wax and an elastomer such as an ethylene/vinyl acetate copolymer.

In recent years water-based pressure sensitive adhesives have become increasingly popular due to the environmental and safety concerns associated with the use of solvent based systems. Such water-borne adhesives may be formulated with various latexes such as that from natural rubber or the synthetic latexes of carboxylated SBR, block elastomer dispersions or the acrylics. This trend has placed new demands on the properties of tackifying resins. Emulsion pressure sensitive adhesives desirably should be prepared from aqueous emulsions of the tackifying resin in which the additives to the tackifier emulsion, such as plasticizers, diluents, emulsifiers and stabilizers be kept to a minimum. Such materials, especially emulsifiers, can have an adverse effect on the functional properties of the adhesive. For example, they may migrate to the surface, due to incompatibility, with concurrent risk of adhesive failure. For the same reason, the nature of the molecular weight distribution of the tackifier resin has assumed greater importance.

In any of these adhesive compositions the actual formulation and ratio of the components can vary widely and is determined by the particular end use for which the adhesive is intended. For example, the myriad of applications for which aqueous based pressure sensitive adhesives are being employed has created numerous "windows of performance" with respect to the rheological and adhesive properties of these formulations as described in a recent review article by K. Foley and S. G. Chu (*Adhesives Age*, September, 1986, pp. 24–28).

Most commercial tackifiers, to be useful, must be light in color. Historically, an acceptable color has been between 5 and 8 on the Gardner scale. More recently lighter colors (Gardner 2, 3) have been required.

The production and commercialization of tackifier resins by the cationic polymerization of terpenes, aliphatic and aromatic petroleum hydrocarbon distillates, synthetic vinyl substituted benzenes, and various combinations thereof are well known in the prior art.

The patent literature contains many examples that describe the polymerization and copolymerization of the $C_{10}$ terpenes alpha-pinene, beta-pinene and dipentene (limonene) with various catalysts and co-catalysts. Several early issues, such as U.S. Pat. No. 2,335,912 (1941), U.S. Pat. No. 2,405,558 (1946) and U.S. Pat. No. 2,931,359 (1960), describe the polymerization of beta-pinene with various Lewis Acids, including aluminum chloride, boron trifluoride and beryllium chloride. U.S. Pat. No. 2,932,631 (1960) teaches the polymerization of beta-pinene with the combination of a Lewis Acid and an organo-aluminum compound. More recently, U.S. Pat. No. 4,487,901 (1984) claims that beta-pinene can be polymerized to a substantially colorless hard resin with a partially hydrolyzed organo-aluminum compound and an alkyl or aryl halide. The following patents teach the preparation of predominantly alpha-pinene resins of relatively high softening point by conducting the polymerizations with aluminum chloride in combination with numerous co-catalysts, all of which are derivatives of silicon, antimony and germanium: U.S. Pat. No. 3,478,007 (1969); U.S. Pat. No. 3,816,381 (1974); U.S. Pat. No. 3,852,218 (1974); U.S. Pat. No. 4,011,385 (1977); U.S. Pat. No. 4,016,346 (1977); U.S. Pat. No. 4,057,682 (1977); U.S. Pat. No. 4,077,905 (1978); U.S. Pat. No. 4,113,653 (1978).

The preparation of a hard tackifying resin from a stream of aliphatic petroleum derivatives in the form of dienes and mono-olefins having 5 or 6 carbon atoms (generally called piperylene or piperylene concentrates) is embodied in U.S. Pat. No. 3,577,398 (1971). In this type of monomer, the dienes are piperylene and/or isoprene although in most such streams the percentage of isoprene is low. Other components may be cyclopentadienes and $C_4$ hydrocarbons such as butadiene, depending upon the actual boiling range of the aliphatic petroleum distillate. The catalyst of choice is anhydrous particulate aluminum chloride. Novel tackifying resins have also been prepared by copolymerizing an aliphatic feed stream of the type just described with relatively pure aromatic hydrocarbon monomers such as styrene, alpha-methyl styrene, para-methyl styrene or the mixture of $C_8$ and/or $C_9$ aromatic hydrocarbons obtained as a petroleum distillate. The latter typically consists of mixtures of varying composition that contain styrene, alpha-methyl styrene, meta-vinyl toluene, para-vinyl toluene, indene, 1-methyl indene, alpha-para-dimethyl styrene and some non-olefenic aromatic hydrocarbons. Descriptions representative of the art for the preparation of these aliphatic/aromatic copolymers may be found in the following patents: U.S. Pat. No. 2,317,857 (1943); U.S. Pat. No. 2,317,858 (1943); U.S. Pat. No. 2,317,859 (1943); U.S. Pat. No. 3,950,453 (1976); U.S. Pat. No. 4,677,176 (1987); U.S. Pat. No. 4,757,114 (1988). Apart from aluminum chloride, the preferred catalysts are claimed to be boron trifluoride gas, boron trifluoride etherate and boron trifluoride complexes with phenols. The preparation of useful aromatic tackifier copolymers from styrene and alpha-methyl styrene is taught in U.S. Pat. No. 4,075,404 (1978) with the catalyst of choice being boron trifluoride gas.

Tackifying resins that are copolymers of terpenes with various aliphatic and aromatic hydrocarbons are also known from the patent literature. U.S. Pat. No. 3,413,246 (1968) discloses pressure sensitive adhesive compositions comprising a rubbery elastomer and a copolymer of a cylic monoterpene hydrocarbon and styrene or a substituted styrene. The resins are prepared with anhydrous aluminum chloride or boron trifluoride etherate. In U.S. Pat. No. 3,478,005 (1969) the copolymerization of terpenes, especially alpha-pinene, with a conjugated $C_5$ diolefin feedstock is taught. These resins are prepared by using aluminum chloride as the catalyst. The preparation of modified beta-pinene resins are described in U.S. Pat. No. 3,467,632 (1969). Beta-pinene is co-reacted with isoprene and/or piperylene. The preferred catalysts are aluminum chloride and aluminum bromide.

The increased variety of applications for adhesive formulations and the trend toward waterborne systems, has created a demand within the industry for tackifying resins with lower softening points than have generally been available in the past. Lower softening point resins are inherently more amenable to being incorporated into stable aqueous dispersions. For example, U.S. Pat. No. 4,487,873 (1984) teaches the addition of a naphthenic oil to a hydrocarbon resin with a 95° C. softening point prior to dispersing the resin by an invert emulsion technique that is aided by the use of added surfactants. Since the molecular weight distribution of the tackifying resin is important with regard to end use performance of the adhesive, the practice of adding low molecular weight oligomers or other diluents in order to lower the softening point of a resin may not be desirable. U.S. Pat. No. 4,670,504 (1987) embodies the combination of a rubber latex and a water dispersable resinous tackifier where the tackifier resin has a built-in propensity for dispersing in water. The tackifier is preferably a polymerized terpene hydrocarbon resin that has been condensed with an unsaturated carboxylic acid or anhydride prior to being neutralized with a volatile amine base and dispersed in an aqueous medium. The starting resin must have a sufficiently low softening point so as to produce a resin composition that can be readily emulsified without the use of external surfactants or plasticizers.

This invention relates to the cationic polymerization of $C_{10}$ terpenes, vinyl aromatic compounds and $C_5$ hydrocarbon dienes and combinations thereof to produce tackifying resins that are useful in adhesive formulations. The continued growth and expanding diversity of adhesive applications have created a demand for both new tackifier resin compositions and modifications in the properties of existing resins.

A need has developed for tackifying resins with lower softening points and narrower molecular weight distributions than have generally been available in the past. Such resins facilitate the formulation and application of hot melt and pressure sensitive adhesives. The industry trend toward waterborne pressure sensitive adhesive formulations also creates a requirement for low softening point tackifier resins that are amenable to aqueous dispersion. Methods for reducing the softening point of resins such as adding low molecular weight oligomers or raising the temperature of the polymerization reaction are undesirable because they detract from the performance and appearance of the adhesive. Catalyst systems designed specifically for lowering the softening points of resins also have deficiencies, ranging from inferior yields, bi-modal molecular weight distributions and inferior performance parameters to practical considerations for manufacturing such resin compositions.

One object of this invention is to produce tackifier resins with the desired softening points without the deleterious characteristics of the prior art. Surprisingly, it has been found that this can be achieved by polymerizing monomers, those that tend to give high softening point resins, with novel catalyst systems that consist of a combination of a Lewis Acid and an organic ketone producing resins with lowered softening points.

A need also exists for a means to copolymerize monomers of inherently different reactivity so as to generate new tackifier compositions. Attempts to co-react two such monomers with the catalysts known to the art tends to give a mixture of homopolymers of different molecular weight and with little utility in the formulation of adhesives. Accordingly, it is another object of this invention to provide unique tackifying resins of varying composition and possessing a narrow molecular weight distribution by copolymerizing monomers of differing chemical reactivity with the novel catalyst systems of this invention.

An additional, and unexpected, benefit from the use of the catalyst systems of this invention is that the resins produced with a Lewis Acid/ketone complex are lighter in color than are the resins produced with the Lewis Acids alone. The resins produced by this invention are generally 1 to 2 Gardner colors lighter than conventional resins.

The backbone structure and the molecular weight distribution of a tackifying resin are critical with respect to the performance of such a resin in an adhesive formulation since these properties can influence the compatibility of the resin with the elastomer. In the past, the ability to manipulate resin compatibility has been limited and controlled largely by adjusting the components of the monomer charge. If the adhesive formulation is largely aromatic in nature, a larger proportion of aromatic or vinyl substituted aromatic monomers would be incorporated into the feed blend for the tackifying resin. On the other hand, if the adhesive formulation is predominantly aliphatic in nature, the monomer feed would contain a larger percentage of aliphatic monomers such as the $C_{10}$ terpenes or the $C_5$ diene hydrocarbons.

To some degree, the molecular weight distribution and compatibility of a tackifying resin can be regulated by adjusting polymerization conditions, such as reaction temperature, catalyst type and usage level, polymerization residence time, sequential addition of comonomers, and choice of solvent. However, the ability to benefit by manipulation of the feed stream composition and/or reaction conditions is often limited by the inherently different reactivity between many of the aforementioned monomers. In spite of attempts to do otherwise, resins may still have exceptionally broad or multi-modal molecular weight distributions that detract from resin performance as a tackifying agent. The catalyst systems of this invention overcome these problems by permitting monomers of different reactivity to copolymerize under a variety of reaction conditions to produce resins of relatively narrow molecular weight distributions. These novel catalysts also allow homopolymerization of various aliphatic and aromatic monomers to give resins having a lower softening point, narrower molecular weight distribution, and lighter colors than have been generally available with the catalysts described by the prior art.

The utility of beta-pinene as a feedstock for the preparation of tackifying resins has become limited in recent years. This very reactive $C_{10}$ terpene monomer homopolymerizes to give relatively high softening point resins (ring and ball softening points in excess of 100° C.) with aluminum chloride, the catalyst of choice for commercial manufacture of such resins. U.S. Pat. No. 4,670,504 (6/2/87, Sylvachem Corporation) teaches that a beta-pinene resin with a low softening point can be prepared with a catalyst system comprised of boron trifluoride etherate and normal hexanol. However, the use of this catalyst system has certain disadvantages. The liberation of the extremely volatile and flammable compound ethyl ether upon quenching the polymerization medium would render commercial practice hazardous. Due to its low solubility in water and boiling point (175° C. at 760 mm Hg), the hexanol co-catalyst will hamper recovery and reuse of the xylene solvent.

We have discovered, quite unexpectedly, that beta-pinene resins with a low softening point and narrow molecular weight distribution can be prepared with a catalyst system comprised of approximately equimolar amounts of a Lewis Acid and an organic ketone. Low molecular weight ketones are water soluble and facilitate removal in workup. Use of the Lewis Acid and ketone overcomes the shortcomings of the catalyst system described in U.S. Pat. No. 4,670,504, while still permitting the manufacture of a beta-pinene resin with a low softening point (less than 90° C.) and a narrow molecular weight distribution.

Normally, the use of oxygenated organic catalyst modifiers or high reaction temperatures (greater than about 65° C.) to lower the softening point of beta-pinene resins results in unusable products. The resins tend to be produced in low yields and with bi-modal molecular weight distributions. For example, the use of oxygenated organic compounds such as alcohols, ethers, esters or carboxylic acids as catalyst modifiers with aluminum chloride is known to lower the softening point and number average molecular weight of a beta-pinene resin, but this results in significantly increased concentrations of dimeric and trimeric oligomers, leading to an undesirable bi-modal molecular weight distribution. Increasing the polymerization temperature, while still using aluminum chloride alone as the catalyst, has a similar negative impact on molecular weight distribution with the added disadvantage of producing a very dark colored resin.

A preferred application of the present invention provides a method for the polymerization of beta-pinene with an aluminum chloride/organic ketone catalyst. The resin produced has a relatively low softening point, a narrower molecular weight distribution, and a lighter color when compared to a resin produced with aluminum chloride alone. This unique catalyst polymerization behavior is not limited to complexes of organic ketones with aluminum chloride. Similar utility has been demonstrated with aluminum bromide and boron trifluoride when these Lewis Acids are complexed with organic ketones.

Generally, the preferred mole ratio of Lewis Acid to organic ketone is one to one. The Lewis Acid and organic ketone may be mixed in a mole ratio of from 1.25/1 to 0.75/1. If the Lewis Acid is used in a substantial excess relative to the ketone, the resin will have an elevated softening point. However, if the molar concentration of organic ketone exceeds the molar concentration of Lewis Acid by more than about twenty-five percent, the catalyst system becomes inactive and no polymerization occurs. The catalyst complex may be employed in either a batch or continuous type of polymerization reaction. In the former case, the Lewis Acid and the ketone may be brought together in the solvent medium prior to monomer addition. In the latter case, a solution of the catalyst complex may be prepared separately and fed to the reactor concurrently with the monomer.

The choice of a particular ketone for the catalyst system is not critical, but low molecular weight ketones, such as acetone or methyl ethyl ketone, are preferred for practical reasons. These ketones are relatively inexpensive and small amounts are required in an equimolar formulation with the Lewis Acid. Low molecular weight ketones can also be readily separated from the quenched polymerization medium by water washing or distillation. Other organic ketones that have been used successfully include acetophenone, benzophenone, methyl isobutyl ketone, cyclopentanone and cyclohexanone.

The ability of the Lewis Acid/ketone combination to produce homopolymers with improved properties is not limited to using beta-pinene as the monomer. For example, styrene can also be reacted with aluminum chloride to give a hard resin. Polymerizing styrene with aluminum chloride/methyl ethyl ketone, in place of aluminum chloride alone, produces a resin with virtually the same softening point and number average molecular weight. However, the homopolymer prepared with the catalyst complex had a narrower molecular weight distribution, a lighter color, and much improved color stability when compared to the resin prepared with only aluminum chloride.

The present invention also provides a method for the copolymerization of monomers of inherently different chemical reactivities to provide unique tackifier resins that have not been available with the previous known art. Often such monomers tend to undergo primarily self-polymerization in the reaction medium, resulting in a mixture of two homopolymers of differing molecular weight as evidenced by a skewed or bi-modal molecular weight distribution in the gel permeation chromatograph. Such compositions are of limited utility as tackifiers.

An excellent example of the ability of the novel catalyst systems of this invention to copolymerize two monomers of different reactivity is provided by styrene and beta-pinene. When a 50/50 blend of these two monomers is polymerized with aluminum chloride, the resulting resin possesses a broad multi-modal molecular weight distribution. When the same monomer blend is polymerized with an equimolar complex of aluminum chloride and acetone, a resin is produced that has essentially the same number average molecular weight as the control, but which now displays a narrow uni-modal molecular weight distribution in the gel permeation chromatograph. The true copolymer produced with the catalyst complex also is of substantially lighter color than the resin composition derived from aluminum chloride alone.

These effects are not limited to a monomer blend comprised of equal weights of styrene and beta-pinene. In addition to varying the monomer blend ratio, the softening points and number average molecular weights of beta-pinene/styrene copolymers produced with the catalysts of this invention can be regulated by varying the reaction temperature, while still maintaining a narrow, uni-modal molecular weight distribution in the product resin.

The ability of Lewis acid/organic ketone complexes to copolymerize monomers of differing reactivity can be extended to systems other than beta-pinene and styrene. Other dual monomer blends where the efficacy of such catalyst systems could be demonstrated include beta-pinene and alpha-methyl styrene; beta-pinene and para-methyl styrene; beta-pinene and a $C_5$ hydrocarbon diene; styrene and alpha-methyl styrene; and styrene with a $C_5$ hydrocarbon diene.

Therefore, the present invention provides a method for the polymerization or copolymerization of monomers selected from the group consisting of C-10 terpenes, vinyl aromatics and C-5 dienes with a Lewis acid-organic ketone catalyst mixture. In a preferred form of the invention, the Lewis acid is chosen from the group consisting of aluminum chloride, aluminum bromide and boron trifluoride. The mole ratio of Lewis acid to ketone is between about 1.25 and about 0.75. A preferred mole ratio is about 1.00. The monomer or blend of monomers is added to the catalyst mixture to form the reaction mixture. The reaction mixture is maintained at a temperature of between 10° C. and 60° C. until the reaction is complete. Upon completion, the mixture is quenched with water and the polymerized or copolymerized resin is recovered from the reaction mixture.

BRIEF DESCRIPTION OF THE DRAWINGS

The present invention may be best understood with reference to the following examples and the attached drawings in which.

TENE ® B beta-pinene, Arizona Chemical Company) was added to the catalyst/solvent slurry over a fifteen minute period during which the reaction temperature was maintained at 50° C. with the aid of external cooling. The temperature of the reaction medium fell to 34° C. during a subsequent 15 minute ride period without cooling. The polymerization reaction was quenched by adding 100 mls. of water to the stirred reaction medium. After cessation of the agitation, the resulting aqueous layer was removed with a pipette. The resin solution was washed two times with 100 ml. increments of water at 60° C. Removing the xylene solvent from the washed resin solution by distillation afforded a beta-pinene resin in a 95% yield that had a ring and ball softening point of 124° C. Analytical data on this resin are summarized in Table I. The neat resin color was 4 on the Gardner scale. The gel permeation chromtograph (GPC) of the resin displayed a broad, skewed bi-modal type of molecular weight distribution with an elution volume maximum at 27 ml. The number average molecular weight ($\overline{M}_n$) of this resin was 1253.

Polymerization of beta-pinene with the AlCl$_3$/acetone catalyst combination was conducted in the same equipment described in the preceding paragraph. Four grams of aluminum chloride were again dispersed in 80 grams of xylene solvent. Prior to monomer addition, 1.74 grams of acetone (an amount equimolar to the AlCl$_3$) were added to the slurry with external cooling. After 15 minutes of mixing, 100 grams of beta-pinene were added dropwise over a fifteen minute period with the polymerization temperature again being maintained at 50° C. The resin solution was quenched and washed in the same manner as the control reaction (AlCl$_3$ alone). Removal of the solvent from the resin solution afforded a 95% yield of a resin that had a ring and ball softening point of 85° C. (Analytical data from this resin are contrasted with the comparable data from the control resin in Table I). The resin color was 3— on the Gardner scale. The GPC of this resin displayed a relatively narrow, uni-modal molecular weight distribution with an elution volume maximum at 33 ml. The number average molecular weight of this resin was 871.

TABLE I

| Catalyst | Reaction Temp., °C. | Resin Yield, % | Resin S.P., °C. | Gardner Color | $\overline{M}_n$ | GPC E$_v$ Max., mls. |
|---|---|---|---|---|---|---|
| AlCl$_3$ | 50 | 95 | 124 | 4 | 1253 | 27 |
| AlCl$_3$/acetone | 50 | 95 | 85 | 3— | 871 | 33 |
| AlCl$_3$ | 80 | 98 | 101 | 9+ | 1121 | 30 |

Figure 3:
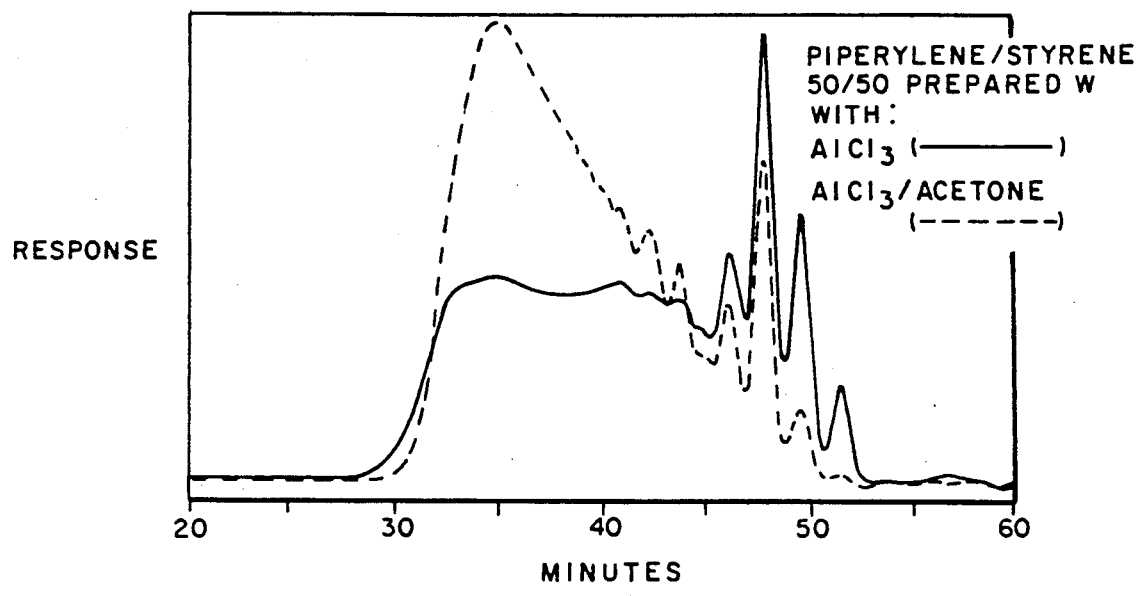
Figure 4:
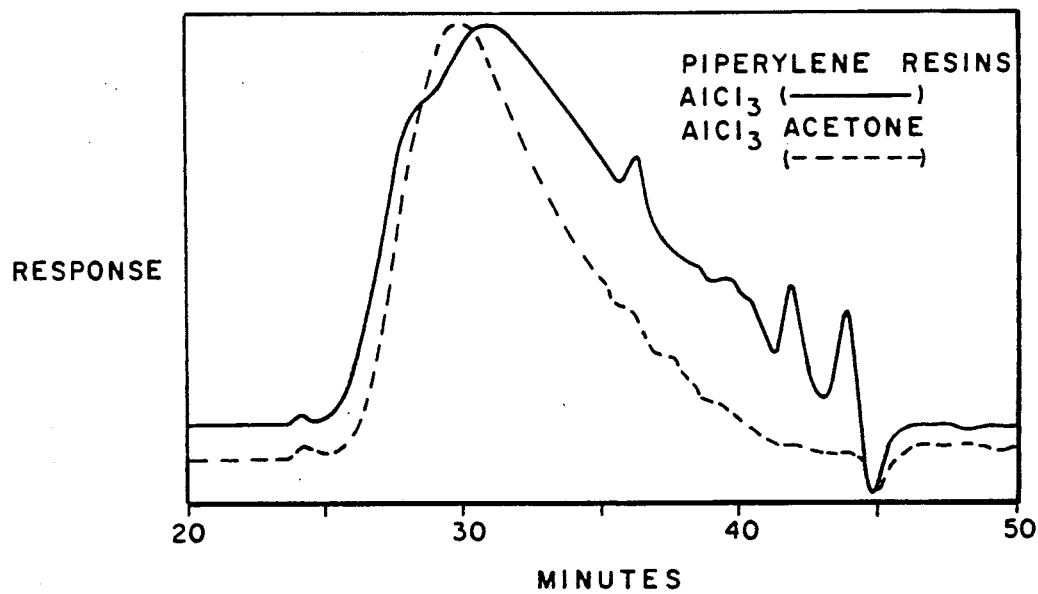

FIG. 3 is a gel permeation chromatograph of piperylene/styrene resins prepared in accordance with Example X with an aluminum chloride catalyst and with an aluminum chloride/acetone catalyst; and FIG. 4 is a gel permeation chromatograph of two piperylene resins prepared in accordance with Example XI with an aluminum chloride catalyst and an aluminum chloride/acetone catalyst.

EXAMPLE I

Polymerization of Beta-Pinene With AlCl$_3$ and with AlCl$_3$/Acetone

Eighty grams of xylene solvent were added to a 500 ml., 3-neck round bottom flask that was equipped with a thermometer and mechanical agitation and was blanketed under a nitrogen atmosphere. Four grams of aluminum chloride catalyst were subsequently dispersed in the solvent. One hundred grams of beta-pinene (ACIN- A third resin was prepared, in the same manner as the AlCl$_3$ control reaction, except that the polymerization temperature was maintained at 80° C. rather than 50° C. The higher reaction temperature produced a dark colored resin with only a modest reduction in softening point and molecular weight, vis-a-vis the control (Table I). The GPC retained a skewed appearance with a high molecular weight peak eluting at 30 mls.

EXAMPLE II

Polymerization of Beta-Pinene With Complexes of AlCl$_3$ and Ketones Other Than Acetone (Cyclohexanone, Acetophenone).

A beta-pinene resin was prepared in the same manner as described in Example I, except that the 4.0 gms. of AlCl$_3$ was complexed with 2.95 gms. of cyclohexanone (an equimolar amount) rather than acetone prior to the addition of the monomer. The polymerization temperature was 60° C. The beta-pinene homopolymer was isolated in a 95% yield and had a ring and ball softening point of 77° C. (refer to Table II). The GPC of the resin displayed a narrow uni-modal molecular weight distribution with a median elution volume maximum at 33.5 mls. The polymer had a number average molecular weight of 812. Another beta-pinene resin was prepared in a similar manner with 4.0 gms. of AlCl₃ and 3.52g of acetophenone. The results were similar to the reaction with AlCl₃/cyclohexanone (refer to Table II).

TABLE II

| Catalyst | Reaction Temp., °C. | Resin Yield, % | Resin S.P., °C. | Gardner Color | $\overline{M}_n$ | GPC $E_v$ Max., mls. |
|---|---|---|---|---|---|---|
| AlCl₃/ cyclohexanone | 60 | 95 | 77 | 4+ | 812 | 33.5 |
| AlCl₃/ acetophenone | 60 | 96 | 77 | 5− | 801 | 33.5 |

EXAMPLE III

Polymerization of Beta-Pinene With AlBrhd 3 and AlBr₃/ Methyl Ethyl Ketone.

Beta-pinene was polymerized in the same manner as the control reaction of Example I, except that AlBr₃ (8.0g) was employed as the Lewis Acid catalyst in place of AlCl₃. A high softening point polymer with an asymmetrical molecular weight distribution was recovered in a 98% yield (Table III).

TABLE III

| Catalyst | Reaction Temp., °C. | Resin Yield, % | Resin S.P., °C. | Gardner Color | $\overline{M}_n$ | GPC $E_v$ Max., mls. |
|---|---|---|---|---|---|---|
| AlBr₃ | 50 | 98 | 125 | 4− | 1247 | 30.0 |
| AlBr₃/methyl ethyl ketone | 50 | 92 | 104 | 3+ | 1009 | 34.0 |

Figure 1:
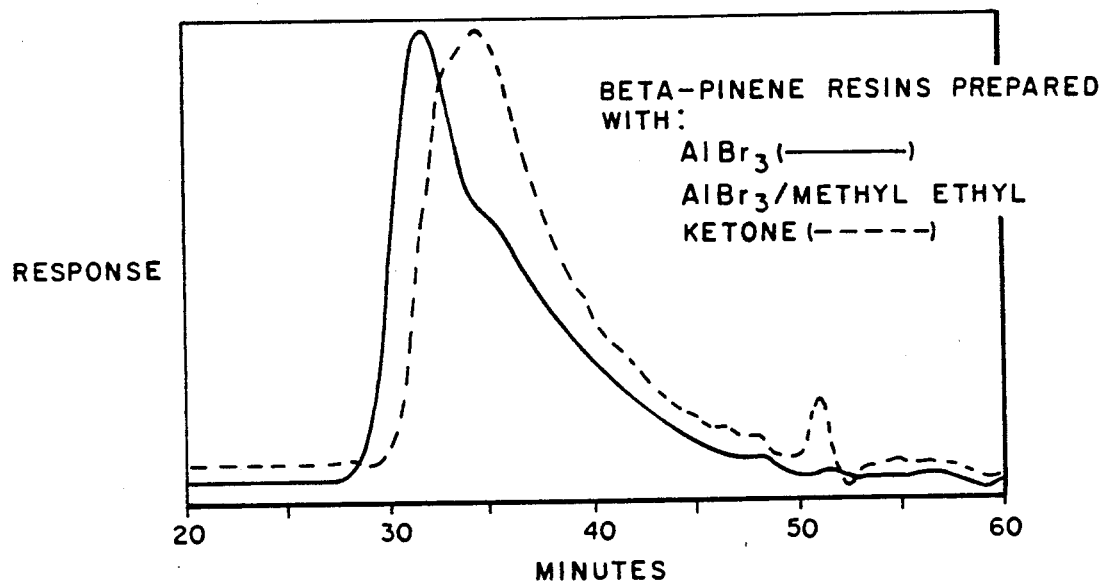
FIG. 1 is a gel permeation chromatograph, which is representative of the molecular weight distribution, of beta-pinene resins prepared in accordance with Example III with an aluminum bromide catalyst and with an aluminum bromide/methyl ethyl ketone catalyst.

Equimolar amounts of AlBr₃ (8.0 gms.) and methyl ethyl ketone (2.16 gms.) were complexed in 80 gms. of xylene solvent prior to the addition of 100 gms. of beta-pinene, while controlling the reaction temperature at 50° C. A resin with a 104° C. softening point was recovered in 92% yield (Table III). The downward shift in molecular weight distribution resulting from the use of methyl ethyl ketone as a co-catalyst is evident in FIG. 1, where the gel permeation chromatographs of the two resins of this example are contrasted.

EXAMPLE IV

Polymerization of Beta-Pinene With BF₃/Acetone

The equipment described in Example I was modified so that a gaseous catalyst could be introduced into the solvent. After 1.74 gms. of acetone had been added to 80 gms. of xylene solvent, boron trifluoride gas was sparged into the solvent solution until the ketone had trapped an equimolar amount (2.0 gms.) of this particular Lewis Acid. With the exception that the reaction temperature was 10° C., the polymerization of beta-pinene and subsequent resin isolation were as described in Example I. A resin with a 73° C. softening point was recovered in a 95% yield (Table IV).

TABLE IV

| Catalyst | Reaction Temp., °C. | Resin Yield, % | Resin S.P., °C. | Gardner Color | $\overline{M}_n$ | GPC $E_v$ Max., mls. |
|---|---|---|---|---|---|---|
| BF₃/acetone | 10 | 95 | 73 | 3 | 742 | 35 |

The GPC of this resin displayed the presence of some residual low molecular weight oligomers in conjunction with the dominant higher molecular weight peak that possessed the narrow, uni-modal appearance characteristic of the beta-pinene resins prepared using the AlCl₃/ketone complexes.

EXAMPLE V

Copolymerization of Beta-Pinene and Styrene With AlCl₃ and with AlCl₃/Acetone.

For a control reaction, 100 gms. of a monomer blend comprised of equal amounts of beta-pinene and styrene was polymerized in 80 gms. of xylene at 40° C. using 4.0 gms. of AlCl₃ as the catalyst. A resin with an 87° C. softening point was recovered in a yield of 107% (yields in excess of 100% are indicative of solvent incorporation into the resin). A second resin was prepared in an identical manner from the same 50/50 monomer blend of beta-pinene and styrene except that an equimolar complex of AlCl₃ (4.0 gms.) and acetone (1.74 gms.) was employed as the catalyst. The physical properties of these two resins are contrasted in Table V.

TABLE V

| Catalyst | Reaction Temp., °C. | Resin Yield, % | Resin S.P., °C. | Gardner Color | $\overline{M}_n$ | GPC $E_v$ Max., mls. |
|---|---|---|---|---|---|---|
| AlCl₃ | 40 | 107 | 87 | 5− | 838 | Multi-modal |
| AlCl₃/acetone | 40 | 105 | 75 | 2+ | 796 | 37.5 |

Figure 2:
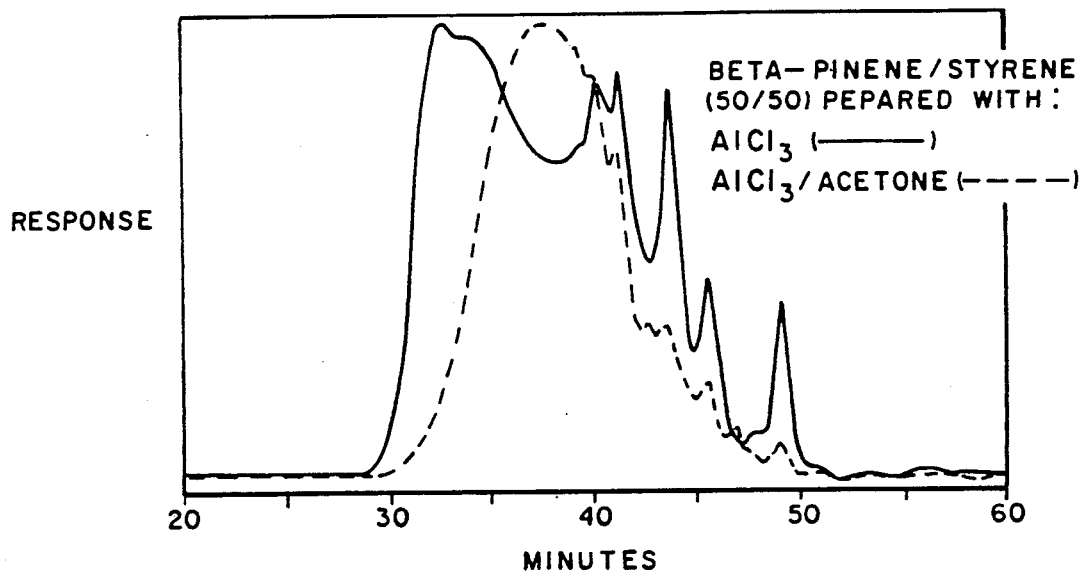
FIG. 2 is a gel permeation chromatograph of beta-pinene/styrene resins prepared in accordance with Example V with an aluminum chloride catalyst and with an aluminum chloride/acetone catalyst.

The gel permeation chromatographs of the two resins are superimposed in FIG. 2. Although both resins have comparable number average molecular weights, the resin prepared with the AlCl₃/ acetone catalyst had a relatively narrow, uni-modal molecular weight distribution, whereas the resin prepared with AlCl₃ alone had a broad, multi-modal molecular weight distribution.

EXAMPLE VI

Copolymerization of Beta-Pinene and Styrene With AlCl$_3$/Methyl Ethyl Ketone at Different Temperatures.

Four grams of aluminum chloride were complexed with 2.16 grams of methyl ethyl ketone (an equimolar amount) in 80 grams of xylene using the equipment as described in Example I. One hundred grams of a monomer blend comprised of 70 parts of beta-pinene and 30 parts of styrene were added to the solvent/catalyst blend while maintaining the reaction temperature at 45° C. Quenching, washing and solvent removal yielded 98% of a hard resin with a 72° C. softening point. This resin had a Gardner color of 3-, a number average molecular weight of 912 and an exceptionally narrow molecular weight distribution with an elution volume maximum at 34.5 ml. Two additional resins were prepared in an identical manner from the same monomer blend except that the polymerization temperatures were 30° C. and 60° C., respectively. The properties of the three resins are collated in Table VI.

TABLE VI

| Catalyst | Reaction Temp., °C. | Resin Yield, % | Resin S.P., °C. | Gardner Color | $\overline{M}_n$ | GPC E$_v$ Max., mls. |
|---|---|---|---|---|---|---|
| AlCl$_3$/methyl ethyl ketone | 30 | 98 | 83 | 1+ | 1186 | 33.0 |
| AlCl$_3$/methyl ethyl ketone | 45 | 98 | 72 | 3- | 912 | 34.5 |
| AlCl$_3$/methyl ethyl ketone | 60 | 99 | 60 | 5- | 580 | 36.0 |

The resins prepared at polymerization temperatures of 30° C. and 60° C. also had exceptionally narrow molecular weight distributions and the resin prepared at 30° C. had an exceptionally light color.

EXAMPLE VII

Polymerization of Styrene With AlCl$_3$ and With AlCl$_3$/Methyl Ethyl Ketone.

Four grams of AlCl$_3$ were complexed with an equimolar amount of methyl ethyl ketone (2.16 gms.) in 80 gms. of xylene solvent. One hundred grams of a pure styrene monomer were polymerized at a reaction temperature of 45° C. in the same manner as described in previous examples. A control experiment was also performed in which the styrene was polymerized at 45° C. with 4 gms. of AlCl$_3$ only. The physical properties of the two styrene homopolymers are compared in Table VII.

TABLE VII

| Catalyst | Reaction Temp., °C. | Resin Yield, % | Resin S.P., °C. | Gardner Color | $\overline{M}_n$ | GPC E$_v$ Max., mls. |
|---|---|---|---|---|---|---|
| AlCl$_3$ | 45 | 97 | 83 | 2 | 923 | 30.0 |
| AlCl$_3$/methyl ethyl ketone | 45 | 104 | 85 | 1- | 986 | 30.0 |

Although both resins had an essentially uni-modal molecular weight distribution, that of the resin prepared from AlCl$_3$/ methyl ethyl ketone was considerably narrower than that of the control resin made with AlCl$_3$ alone. During a color stability test in which the molten resins were exposed to the atmosphere in a 105° C. oven for 18 hrs., the control resin darkened from a Gardner color of 2 to 5. The color of the styrene homopolymer prepared with the ketone complex barely darkened from a Gardner 1- to a 1.

EXAMPLE VIII

Copolymerization of Beta-Pinene and Alpha-Methyl Styrene With AlCl$_3$ and AlCl$_3$/Methyl Ethyl Ketone.

Four grams of AlCl$_3$ were complexed with 2.16 gms. of methyl ethyl ketone in 80 gms. of xylene solvent. One hundred grams of a monomer blend comprised of 70 parts of beta-pinene and 30 parts of alpha-methyl styrene were added to the catalyst/solvent blend while maintaining the polymerization temperature at 45° C. Subsequent quenching, washing and solvent removal provided a resin in 93% yield that had a ring and ball softening point of 57° C. and a Gardner color of 2- (Table VIII). This resin displayed a uni-modal molecular weight distribution in the GPC with an elution volume maximum at 35 mls.

TABLE VIII

| Catalyst | Reaction Temp., °C. | Resin Yield, % | Resin S.P., °C. | Gardner Color | $\overline{M}_n$ | GPC E$_v$ Max., mls. |
|---|---|---|---|---|---|---|
| AlCl$_3$/methyl ethyl ketone. | 45 | 93 | 57 | 2- | 695 | 35 |
| AlCl$_3$ | 45 | 96 | 91 | 4+ | 902 | 35 and 28 |

The experiment was repeated except that the ketone catalyst modifier was omitted. One hundred grams of the monomer blend comprised of 70 parts of beta-pinene and 30 parts of alpha-methyl styrene was added to the catalyst slurry consisting of 4.0 gms. of AlCl$_3$ dispersed in 80 gms. of xylene. The polymerization temperature was again controlled at 45° C. The recovered resin (96% yield) had a 91° C. ring and ball softening point and a Gardner color of 4+ (Table VIII). The molecular weight distribution of the resin was distinctly bi-modal with elution volume maximums at both mls. and 35 mls.

EXAMPLE IX

Copolymerization of Beta-Pinene and A C$_5$ Hydrocarbon With AlCl$_3$ and AlCl$_3$/Methyl Ethyl Ketone.

A monomer feed stream comprised of 75 parts of beta-pinene and 25 parts of a piperylene concentrate was polymerized with AlCl$_3$ and AlCl$_3$/ methyl ethyl ketone, respectively, at 50° C. in the same manner as described in the preceding examples. The characteristics of the two resins are described in Table IX.

TABLE IX

| Catalyst | Reaction Temp. °C. | Resin Yield, % | Resin S.P., °C. | Gardner Color | $\overline{M}_n$ | GPC E$_v$ Max., mls. |
| --- | --- | --- | --- | --- | --- | --- |
| AlCl$_3$ | 50 | 93 | 111 | 6— | 1116 | 28.0 |
| AlCl$_3$/methyl ethyl ketone | 50 | 94 | 85 | 4— | 851 | 31.5 |

The molecular weight distribution of the control resin, prepared with 4% aluminum chloride, was skewed towards the high molecular weight region with an elution volume maximum at 28 mls. The molecular weight distribution of the resin prepared using 4.0% AlCl$_3$/2.16% methyl ethyl ketone as the catalyst, while relatively broad, was uni-modal and Gaussian in appearance with an elution volume maximum at 31.5 mls.

EXAMPLE X

Copolymerization of A C$_5$ Hydrocarbon and Styrene With AlCl$_3$ and With AlCl$_3$/Acetone.

A monomer blend consisting of equal parts by weight of piperylene concentrate and styrene was copolymerized at 10° C. in xylene solvent with both AlCl$_3$ (4.0%) and AlCl$_3$/ acetone (4.0%/1.74%), respectively. The physical properties of these two resins are presented in Table X.

TABLE X

| Catalyst | Reaction Temp., °C. | Resin Yield, % | Resin S.P., °C. | Gardner Color | $\overline{M}_n$ | GPC E$_v$ Max., mls. |
| --- | --- | --- | --- | --- | --- | --- |
| AlCl$_3$ | 10 | 83 | 13 | 5 | 518 | Multi-modal |
| AlCl$_3$/Acetone | 10 | 83 | 35 | 3 | 592 | 34.5 |

The gel permeation chromatographs of the two resins are contrasted in FIG. 3. The molecular weight distribution of the polymer prepared with AlCl$_3$ only was extremely broad and multi-modal in appearance. The molecular weight distribution of the resin derived from the AlCl$_3$/ acetone complex displayed a somewhat skewed high molecular weight band (elution volume maximum at 34.5 mls.) and significantly lesser amounts of low molecular weight oligomers than were present in the control resin.

EXAMPLE XI

Polymerization of a C$_5$ Diene Hydrocarbon With AlCl$_3$ and AlCl$_3$/Actone

One hundred grams of a piperylene concentrate was added to 80 grams of xylene solvent that contained a complex of 4.0 grams of AlCl$_3$ with 1.74 grams of acetone. The polymerization was conducted at 45° C. in the same manner as described in Example I, with the exception that the reaction time after the completion of monomer addition was extended from 15 minutes to one hour. A control reaction was conducted using 4.0 grams of AlCl$_3$ as the catalyst. The physical properties of the two resins are presented in Table XI.

TABLE XI

| Catalyst | Reaction Temp, C. | Resin Yield, % | Resin S.P., °C. | Gardner Color | $\overline{M}_n$ | GPC E$_v$ Max., mls. |
| --- | --- | --- | --- | --- | --- | --- |
| AlCl$_3$ | 45 | 98 | 52 | 6— | 756 | multimodal |
| AlCl$_3$/acetone | 45 | 59 | 27 | 5 | 975 | 30.0 |

The gel permeation chromatographs of the two resins are contrasted in FIG. 4. The control resin GPC trace displays both a high molecular weight shoulder and a broad, tailing range of low molecular weight material. In comparison, the GPC trace of the resin prepared with the aluminum chloride/acetone catalyst is uni-modal and possesses a relatively narrow molecular weight distribution.

EXAMPLE XII

Copolymerization of Beta-Pinene, a C$_5$ Hydrocarbon and Styrene With AlCl$_3$ and AlCl$_3$/Methyl Ethyl Ketone A monomer feed stream comprised of 50 parts of beta-pinene, 30 parts of a piperylene concentrate and 20 parts of styrene was polymerized with AlCl$_3$ and AlCl$_3$/ methyl ethyl ketone, respectively, at 40° C. in the same manner as described in the preceding examples. The properties of the two resins are compared in Table XII.

TABLE XII

| Catalyst | Reaction Temp., °C. | Resin Yield, % | Resin S.P., °C. | Gardner Color | $\overline{M}_n$ | GPC E$_v$ Max, mls. |
| --- | --- | --- | --- | --- | --- | --- |
| AlCl$_3$ | 40 | 102 | 83 | 5+ | 896 | 33.0 |
| AlCl$_3$/methyl ethyl ketone | 40 | 90 | 60 | 3— | 786 | 35.5 |

The molecular weight distribution of the control resin, prepared with 4% AlCl$_3$, was extremely skewed and multimodal. The gel permeation chromatograph displayed a maximum at 33.0 mls with pronounced shoulders also eluting at 36.0 and 42.0 mls. The molecular weight distribution of the resin prepared using 4.0% AlCl$_3$/2.16% methyl ethyl ketone as the catalyst was uni-modal with an elution volume maximum at 35.5 mls.

It may be seen from the foregoing that the present invention provides a method for producing tackifier resins from terpene, vinyl aromatic, or C$_5$ diene monomer streams with a Lewis acid/organic ketone catalyst for use with elastomers in forming adhesives. The present invention also provides a method for producing tackifier resins with relatively low softening points and narrow molecular weight distributions. Also, the present invention provides a method for producing tackifier resins as copolymers of various terpene, vinyl aromatic and C$_5$ diene monomer mixtures with the resins having relatively narrow molecular weight ranges.

Various features of the invention which are believed to be new are set forth in the appended claims.

What is claimed is:

1. A method for the polymerization of a monomer selected from the group consisting of C-10 terpenes, vinyl aromatics and C-5 dienes comprising:
   complexing an organic ketone with a Lewis acid at a mole ratio of from about 0.75 to about 1.25 and producing a catalyst complex;
   adding said monomer to said catalyst complex producing a reaction mixture;
   maintaining said reaction mixture at from about 10° C. to about 60° C. until the reaction is completed;
   quenching said reaction mixture with water; and
   recovering a polymerized resin from the reaction mixture.

2. The method of claim 1 wherein the Lewis acid is selected from the group consisting of aluminum chloride, aluminum bromide and boron trifluoride.

3. The method of claim 1 wherein the monomer is beta-pinene.

4. The method of claim 1 wherein the monomer is styrene.

5. The method of claim 1 wherein the monomer is piperylene.

6. The method of claim 1 wherein the organic ketone is selected from the group consisting of acetone, methyl ethyl ketone, acetophenone, benzophenone, methyl isobutyl ketone, cyclopentanone and cyclohexanone.

7. The method of claim 1 wherien the Lewis acid/ketone mole ratio is about 1.00.

8. A method for the copolymerization of a mixture of monomers comprising:
   complexing an organic ketone with a Lewis acid at a mole ratio of from about 0.75 to about 1.25 and producing a catalyst complex;
   mixing monomers selected from the group consisting of C-10 terpenes, vinyl aromatics and C-5 dienes and producing a monomer blend;
   adding said monomer blend to said catalyst complex producing a reaction mixture;
   maintaining said reaction mixture at from about 10° C. to about 60° C. until the reaction is complete;
   quenching said reaction mixture with water; and
   recovering a copolymerized resin from said reaction mixture.

9. The method of claim 8 wherein the Lewis acid is selected from the group consisting of aluminum chloride, aluminum bromide and boron trifluoride.

10. The method of claim 8 wherein one monomer of the mixture of monomers is a terpene and a second monomer is selected from the group consisting of styrene, alpha-methyl styrene and para-methyl styrene.

11. The method of claim 8 wherein one monomer of the mixture of monomers is beta-pinene and a second monomer is a vinyl aromatic.

12. The method of claim 8 wherein one monomer of the monomer blend is a C10 terpene, a second monomer is a vinyl aromatic and a third monomer is a C-5 diene.

13. The method of claim 8 wherein one monomer of the mixture of monomers is styrene and a second monomer is selected from the group consisting of alpha-methyl styrene, para-methyl styrene and piperylene.

14. The method of claim 8 wherein the organic ketone is selected from the group consisting of acetone, methyl ethyl ketone, acetophenone, benzophenone, methyl isobutyl ketone, cyclopentanone and cyclohexanone.

15. The method of claim 8 wherein the Lewis acid/ketone mole ratio is about 1.00.

* * * * *